Jan. 15, 1924.
G. L. BAKER
1,480,590
PERMUTATION LOCK FOR AUTOMOBILES
Filed Oct. 18, 1922
2 Sheets-Sheet 1
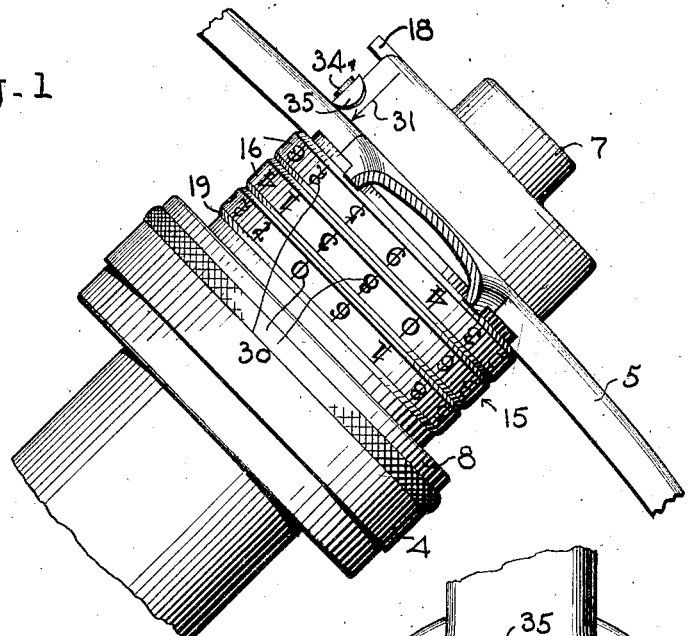
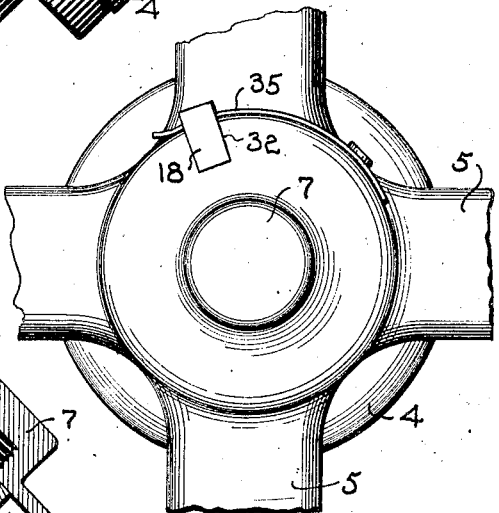
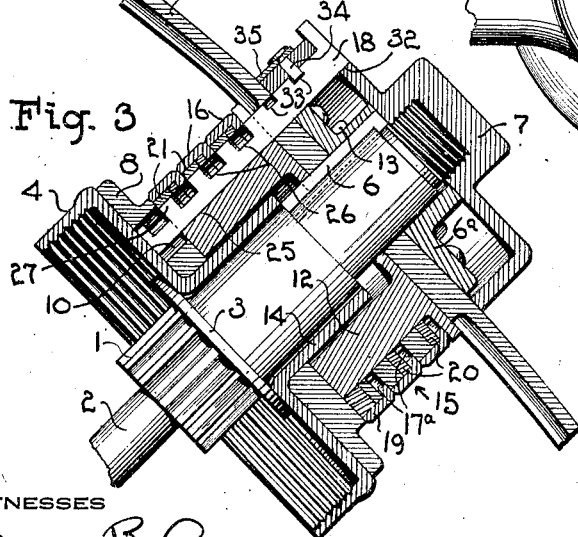
WITNESSES
Gilbert L. Baker
INVENTOR
BY
ATTORNEY Jan. 15, 1924.  
G. L. BAKER  
1,480,590  
PERMUTATION LOCK FOR AUTOMOBILES  
Filed Oct. 18, 1922   2 Sheets-Sheet 2
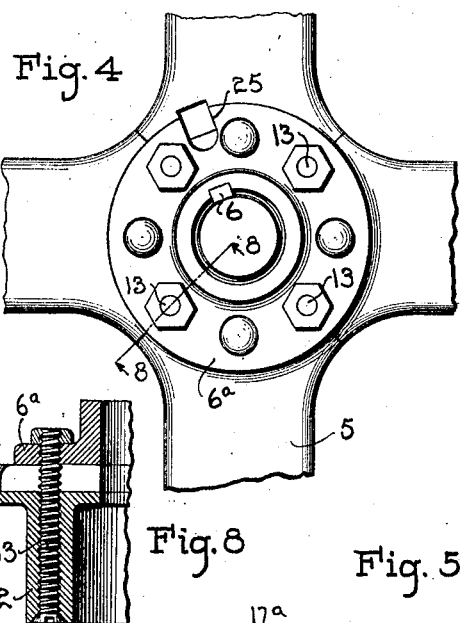
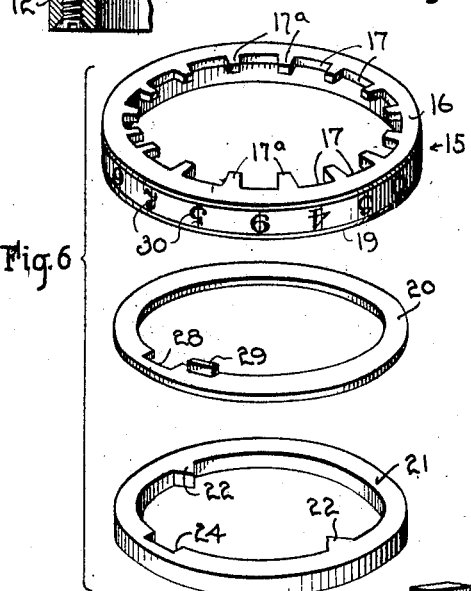
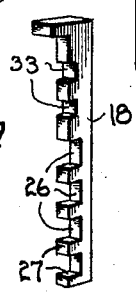
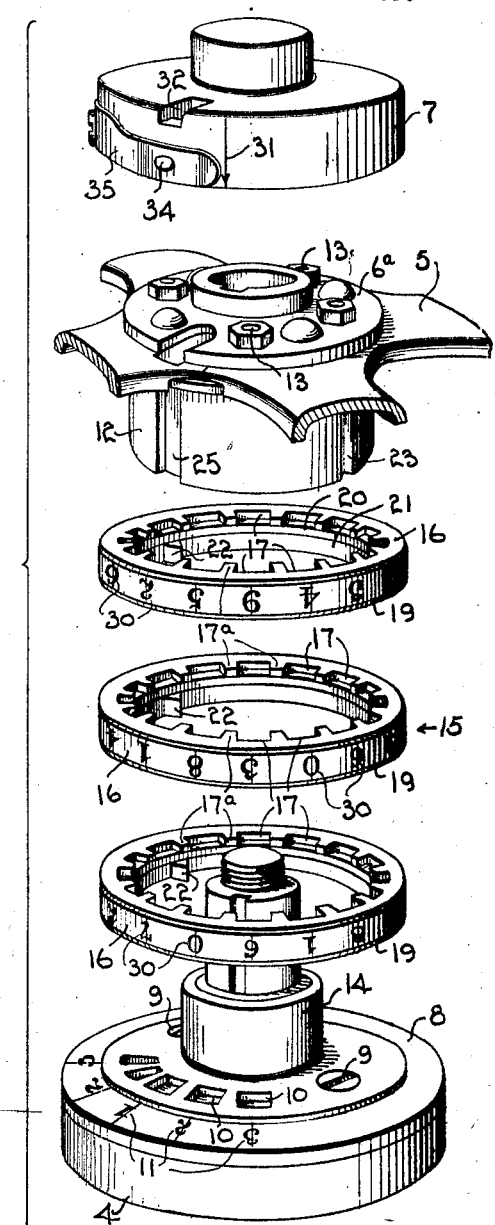
Gilbert L. Baker  
INVENTOR
WITNESSES  
BY  
ATTORNEY Patented Jan. 15, 1924.

1,480,590

UNITED STATES PATENT OFFICE.

GILBERT LINCOLN BAKER, OF OAKDALE, CALIFORNIA.

PERMUTATION LOCK FOR AUTOMOBILES.

Application filed October 18, 1922. Serial No. 595,349.

*To all whom it may concern:*

Be it known that I, GILBERT L. BAKER, a citizen of the United States, residing at Oakdale, in the county of Stanislaus and State of California, have invented new and useful Improvements in Permutation Locks for Automobiles, of which the following is a specification.

My invention relates to a permutation lock, which is particularly adapted to be applied to the steering post of an automobile to lock the steering wheel and gear.

The general object of my invention is to provide a lock of this character which will be simple in construction and inexpensive to manufacture, and which may be readily applied to the steering assembly of the more common types of automobiles without any material change in the construction of the latter.

It is also an important object of my invention to provide a lock of this character in which the combination may be easily and quickly changed by the owner without requiring the services of a skilled mechanic.

Other objects and advantages will appear from the following description, and will be more particularly pointed out in the claims.

In the accompanying drawings,

Fig. 1 is a side elevation of a part of the steering gear with my invention applied thereto.

Fig. 2 is a plan view of the steering wheel hub and the lock associated therewith.

Fig. 3 is a vertical longitudinal section through the lock.

Fig. 4 is a plan view of the steering wheel hub with the cap removed.

Fig. 5 is a display view of the lock with the several component parts thereof shown in the relation in which they are to be assembled.

Fig. 6 is a similar view of one of the permutation elements.

Fig. 7 is a perspective view of the locking bolt.

Fig. 8 is a sectional view on the line 8—8, Fig. 4, showing how the core is secured to the hub of the steering wheel.

Referring more particularly to the drawings, the numeral 1 indicates a steering gear pinion such as is used in a Ford automobile. This pinion is secured to a stub shaft 2 in the usual manner, and has a flange 3, at its upper side which is engaged by the steering gear cover 4 to hold the same in its assembled position. A steering wheel 5 is keyed to the upper end of the shaft, as shown at 6, and is held in position by a collar $6^a$, and by the cap 7, the latter being screwed to the steering spindle, while the collar $6^a$ is held by screws to the wheel 5.

In carrying out my invention, I provide an annular plate 8, which may be conveniently secured to the cover 4 by means of screws 9 or the like, and is provided with one or more recesses 10 concentrically arranged and adapted to be engaged by a locking bolt 18 hereinafter described. The position of the several recesses 10 may be conveniently marked by indicia 11.

The core 12 of the lock is preferably secured to the hub of the wheel 5 by means of bolts 13, which pass upwardly through the core, the hub and the flange $6^a$. The core is formed to fit over the usual sleeve 14 provided on the cover 4. Around the core are arranged a plurality of permutation elements 15, each of which includes a revoluble member or tumbler 16 provided with a series of internal spaced notches 17, forming intervening radial projections or teeth $17^a$, any one of which slots is adapted to receive the bolt 18. The tumbler 16 is provided with a downwardly-extending annular flange 19 in which are secured the two ring members 20 and 21. The member 21 is provided with one or more inwardly-extending teeth 22 by means of which it is keyed to the core 12, the latter being provided with corresponding slots 23. The member 21 is also provided with a slot 24, which registers with a corresponding slot 25 in the core 12. The bolt 18 is provided with a plurality of transverse spaced notches 26 which are separated by teeth 27. The slot 25 is of sufficient depth so that the bottoms of the notches 26 of the bolt are flush with the surface of the core when the bolt is inserted, and the slot 24 is of the proper size to receive the teeth 27. The member 20 is also provided with a slot 28, which, when alined with the slot 24, permits the insertion or removal of the bolt. The member 20 is also provided with a lug 29, which may be inserted in any one of the slots 17 of the revoluble member or tumbler 16, and thereby bring the slot 28 into alinement with any one of the other slots 17, as desired. The tumbler 16 is provided with suitable indicia 30, and the cap 7 is provided with a mark, as indicated at 31, to indicate the position to which the member 16 is to be moved in order to unlock the device.

It will be understood, from the foregoing description that the ring member 20 may be adjusted to bring the slot 28 into alinement with any one of the slots 17, the number corresponding to that slot indicating that part of the combination corresponding to that tumbler. When all of the tumblers have been brought into the position corresponding to the combination for which the lock is set, the bolt 18 may be inserted or removed. In any other position of the members 16 and 20, the bolt will be held by the teeth 27. When the bolt is inserted so that its lower end enters one of the recesses 10, in the plate 8, the steering wheel is locked against movement. If a number of recesses 10 are provided as shown in Fig. 5, they may be positioned so that with the bolt in the central slot, the wheels are straight, and if the bolt be inserted in one of the other recesses, the wheels are locked at an angle.

The cap 7 is, of course, provided with a slot 32 to permit the insertion of the bolt therethrough. The upper portion of the bolt may be provided with notches 33 of less depth than the notches 26, either one of which notches 33 is engageable by a pin 34 carried on the end of a leaf spring 35 secured to the cap 7. Thus, the bolt may be held in its locked or unlocked position without regard to the tumblers 16. (Fig. 3).

In the present embodiment of my invention, I have illustrated and described the same in connection with the steering gear of a Ford automobile, but the invention may be readily applied to the steering assembly of any automobile merely by making minor changes in the form thereof. It is also desired to be understood that other modifications may be made in the details of construction within the scope of the appended claims.

What is claimed is:—

1. In an automobile steering assembly, a post having a steering wheel keyed thereto, a gear cover in which the post is journaled, a plate fastened to the cover, a core secured to the wheel hub and covering the plate fastening means, tumblers revolubly mounted on the core, a cap secured onto the outer end of the post and concealing the core securing means, and a bolt insertible through the cap and hub and into said plate, the tumblers being operable to lock the bolt after it has been inserted.

2. In an automobile steering assembly, a post having a steering wheel keyed thereto, a gear cover in which the post is journaled, a plate fastened to the cover and provided with a series of recesses, a core secured to the wheel hub and covering the plate fastening means and provided with a slot, tumblers revolubly mounted on the core, a cap secured onto the outer end of the post and concealing the core securing means, and a bolt insertible through the cap and hub and the slot of the core and the recesses of said plate, the tumblers being operable to lock the bolt after it has been inserted.

3. In an automobile steering assembly, a post having a steering wheel keyed thereto, a cylindrical core secured to the wheel hub and surrounding the post, a plurality of tumblers revolubly mounted on and surrounding the core, a cap screwed to the outer end of the post securing the wheel against removal and concealing the core securing means, a bolt cooperating with the tumblers and the core to lock the cap to the wheel and to lock the wheel to a fixed part of the steering assembly, said bolt being removable only when the tumblers are positioned according to a certain predetermined combination.

4. In an automobile steering assembly, a post having a steering wheel keyed thereto, a core secured to the wheel hub, a plurality of tumblers revolubly mounted on the core, a bolt cooperating with the tumblers to lock the wheel to a fixed part of the steering assembly and removable only when the tumblers are positioned to form a certain predetermined combination, and a pair of ring members associated with each tumbler, one of said ring members being keyed to the core and the other being adjustable circumferentially of the tumbler to change the combination.

5. In an automobile steering assembly, a post having a steering wheel keyed thereto, a core secured to the wheel hub, a plurality of annular permutation elements surrounding the core and each having a ring keyed to the core, a tumbler revoluble with respect to said ring and core to lock or unlock the device, and a second ring adjustable circumferentially of the tumbler to change the combination.

6. In a permutation lock for automobiles, a core adapted to be attached to the steering wheel hub and having a plurality of longitudinal slots, a ring coaxial with the core, having a tooth engaging one of the slots in the core and having a slot in alinement with another slot in the core, a tumbler revoluble with respect to the core and ring and having indicia to mark its position, and a second ring having a slot adapted to be alined with the slot in the first-named ring to permit the insertion of a bolt, and adjustable circumferentially of the tumbler to change the combination.

7. In a permutation lock for automobiles, a core adapted to be attached to the steering wheel hub and having a plurality of longitudinal slots, and a plurality of tumblers revolubly mounted on the core, each tumbler having a series of inwardly-projecting radial teeth and a depending flange, a pair of rings located within the flange, one of said rings having a tooth extending into one of the slots in the core and having a slot in registry with another slot in the core, the other ring having an upwardly-projecting lug which may be selectively secured between any two teeth of the tumbler to provide the desired combination and having an internal slot which may, by movement of the tumbler, be alined with the slot in the first-named ring, and a bolt insertible between the teeth in the tumbler through the alined slots and into a fixed part of the steering assembly and having teeth between which the tumbler teeth and the inner portion of the second ring may pass to lock the device.

8. In a device of the class described, the combination with a steering wheel, gear shaft and cover, of an annular plate, means for securing the same to the cover, a core secured to the wheel hub and keyed to the shaft and concealing said securing means, a plurality of tumblers revolubly mounted on the core and each having a depending flange, a pair of rings located within the flange, one of said rings being keyed to the core and the other keyed to the tumbler and revoluble therewith, a combined clamp nut and cover secured to the end of the shaft, and a key insertible through the clamp nut, tumblers and rings and into said plate to lock the steering gear when the tumblers form a certain combination, the revoluble rings being adjustable circumferentially with respect to the corresponding tumblers to vary the combination.

9. In an automobile steering assembly, a post having a steering wheel keyed thereto, a gear cover in which the post is journaled, a plate fastened to the cover, a core secured to the wheel hub and covering the plate fastening means, tumblers revolubly mounted on the core, a cap secured onto the outer end of the post and concealing the core securing means, a bolt insertible through the cap and hub and into said plate, the tumblers being operable to lock the bolt after it has been inserted, and a spring-pressed pin carried by the cap to engage the bolt to lock the latter independently of the tumblers.

In testimony that I claim the foregoing as my own, I have hereto affixed my signature.

GILBERT LINCOLN BAKER.